United States Patent
Kato

(10) Patent No.: US 9,358,842 B2
(45) Date of Patent: Jun. 7, 2016

(54) TIRE

(75) Inventor: Keiichi Kato, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 457 days.

(21) Appl. No.: 13/696,124

(22) PCT Filed: May 2, 2011

(86) PCT No.: PCT/JP2011/060519
§ 371 (c)(1),
(2), (4) Date: Jan. 7, 2013

(87) PCT Pub. No.: WO2011/138939
PCT Pub. Date: Nov. 10, 2011

(65) Prior Publication Data
US 2013/0098520 A1    Apr. 25, 2013

(30) Foreign Application Priority Data

May 7, 2010 (JP) .................. 2010-107426

(51) Int. Cl.
*B60C 11/13* (2006.01)
*B60C 11/04* (2006.01)

(52) U.S. Cl.
CPC ............. *B60C 11/04* (2013.01); *B60C 11/042* (2013.04); *B60C 11/047* (2013.04); *B60C 11/13* (2013.01);
(Continued)

(58) Field of Classification Search
CPC ........... B60C 11/1315; B60C 11/1323; B60C 11/1353; B60C 11/1307; B60C 11/042; B60C 11/045; B60C 11/047; B60C 2011/133; B60C 2011/1338; B60C 2011/1361
USPC ....................... 152/209.19, 209.24
See application file for complete search history.

(56) References Cited

U.S. PATENT DOCUMENTS

| 6,986,372 B2 * | 1/2006 | Below ............... 152/209.15 |
| 2006/0130950 A1 | 6/2006 | Murata |
| 2006/0157179 A1 | 7/2006 | Bito et al. |

FOREIGN PATENT DOCUMENTS

| CN | 1807132 A | 7/2006 |
| GB | 1351392 | * 4/1974 |

(Continued)

OTHER PUBLICATIONS

English machine translation of JP08-011508, dated Jan. 1996.*

(Continued)

*Primary Examiner* — Steven D Maki
*Assistant Examiner* — Robert Dye
(74) *Attorney, Agent, or Firm* — Sughrue Mion, PLLC

(57) ABSTRACT

A pneumatic tire 1 which includes a plurality of rib-shaped land portions extending in a tire-circumferential-direction and in which a circumferential groove is formed extending in the tire-circumferential-direction between the land portions. The circumferential groove is provided with an intra-groove groove formed to recess inwardly in a tire-radial-direction from the circumferential groove while having its upper ends at a groove bottom of the circumferential groove. Paired inner wall surface and outer wall surface forming the intra-groove groove each continuously extend in tire-circumferential-direction while meandering in tread-width-direction. The intra-groove groove includes a wide groove portion in which a groove width of the intra-groove groove in tread-width-direction is a predetermined width; and a narrow groove portion which is continuous with the wide groove portion and which has a narrower width than the predetermined width. The wide groove portion and the narrow groove portion are alternately provided in tire-circumferential-direction.

2 Claims, 7 Drawing Sheets

(52) U.S. Cl.
CPC ....... *B60C 11/1353* (2013.04); *B60C 2011/133* (2013.04); *B60C 2011/1338* (2013.04); *B60C 2011/1361* (2013.04)

(56) References Cited

FOREIGN PATENT DOCUMENTS

| | | | |
|---|---|---|---|
| JP | S63-25107 | A | 2/1988 |
| JP | 05-065609 | A | 3/1993 |
| JP | 94-004365 | B2 * | 1/1994 |
| JP | 08-011508 | A | 1/1996 |
| JP | 11-048718 | A | 2/1999 |
| JP | 2001-347811 | A | 12/2001 |
| JP | 2006-56480 | A | 3/2006 |
| JP | 2006-151029 | A | 6/2006 |
| JP | 2006-182126 | A | 7/2006 |
| JP | 2006-193110 | A | 7/2006 |
| JP | 2006-205824 | A | 8/2006 |
| JP | 2007-131217 | A | 5/2007 |
| JP | 2010-018125 | * | 1/2010 |

OTHER PUBLICATIONS

English machine translation of JP2006-182126, dated Jul. 2006.*
English machine translation of JP2010-018125, dated Jan. 2010.*
English machine translation of JP94-004365B2, dated Jan. 1994.*
Japanese Official Action Letter, dated Dec. 10, 2013, issued in counterpart Japanese Patent Application No. 2010-107426.
Literature Submission, dated Jul. 5, 2013, in counterpart Japanese Patent Application No. 2010-107426.
Chinese Official Action Letter, dated Sep. 23, 2014, issued in counterpart Chinese Patent Application No. 201180022762.6.
International Search Report of PCT/JP2011/060519 dated Aug. 9, 2011.
Communication dated Mar. 18, 2015, issued by the State Intellectual Property Office of P.R. China in counterpart Chinese application No. 201180022762.6.
Extended European Search Report dated Mar. 12, 2015, issued by the European Patent Office in counterpart European application No. 11777458.8.

* cited by examiner (a)

(b)

TIRE

CROSS REFERENCE TO RELATED APPLICATIONS

This application is a National Stage of International Application No. PCT/JP2011/060519 filed May 2, 2011, claiming priority based on Japanese Patent Application No. 2010-107426 filed May 7, 2010, the contents of all of which are incorporated herein by reference in their entirety.

TECHNICAL FIELD

The present invention relates to a tire which includes multiple rib-shaped land portions extending in a tire circumferential direction and in which a circumferential groove extending in the tire circumferential direction is formed between the land portions.

BACKGROUND ART

Conventionally, as pneumatic tires (tires, hereafter) to be fitted to a passenger car and the like, there has been known a tire in which groove walls of land portions formed by circumferential grooves extending in a tire circumferential direction are provided with recessed portions formed in a tread width direction to improve a drainage performance of water entering the circumferential grooves (Patent Document 1, for example).

Specifically, the recessed portions are provided at predetermined intervals in the tire circumferential direction and groove walls of the recessed portions are formed in half-moon shapes in a tread surface view. In this tire, water flowing in the circumferential grooves tends to flow more smoothly along the half-moon shapes of the recessed portions than in the case where the recessed portions are formed in rectangular shapes in the tread surface view, and the drainage performance is thereby improved.

PRIOR ART DOCUMENT

Patent Document

Patent Document 1: Japanese Patent Application Publication No. 2006-205824 (Page 5, FIG. 1)

SUMMARY OF THE INVENTION

However, the conventional tire described above have the following problem. Since the groove walls of the land portions are recessed by the recessed portions, the stiffness of the land portions deteriorates. There is a concern that this may negatively affect driving stability, a braking performance, and the like.

In view of this, an object of the present invention is to provide a tire having a circumferential groove formed therein, and being capable of suppressing deterioration in stiffness of land portions and also improving a drainage performance.

In order to solve the above-mentioned problem, the present invention has features as described below. The first feature of the present invention is summarized as a tire (e.g., pneumatic tire 1) which includes a plurality of rib-shaped land portions (land portions 10-40) extending in a tire circumferential direction and in which a circumferential groove (circumferential groove 50-70) is formed extending in the tire circumferential direction between the land portions, wherein the circumferential groove is provided with an intra-groove groove (intra-groove groove 80) formed to recess inwardly in a tire radial direction from the circumferential groove while having its upper ends at a groove bottom (groove bottom 71) of the circumferential groove, paired wall surfaces (inner wall surface 82 and outer wall surface 83) forming the intra-groove groove each continuously extend in the tire circumferential direction while meandering in the tread width direction, the intra-groove groove includes a wide groove portion (wide groove portion 80A) in which a groove width of the intra-groove groove in the tread width direction is a predetermined width, and a narrow groove portion (narrow groove portion 80B) which is continuous with the wide groove portion and which has a narrower width than the predetermined width, and the wide groove portion and the narrow groove portion are alternately provided in the tire circumferential direction.

According to the above feature, the intra-groove groove is formed in the circumferential groove. Moreover, the paired wall surfaces forming the intra-groove groove each continuously extend in the tire circumferential direction while meandering in the tread width direction. In this configuration, the volume of the circumferential groove is increased while flows of water along the meandering of the paired wall surfaces is made to occur in the circumferential groove.

Specifically, the intra-groove groove includes the wide groove portion and the narrow groove portion. Accordingly, the water flowing in the intra-groove groove pulsates in the circumferential groove after passing through the wide groove portion, due to a decrease in the groove width of the intra-groove groove. The pulsating water tends to be drained from the wide groove portion to the narrow groove portion in directions of extended lines of flow lines along the paired wall surfaces. Accordingly, a drainage performance of water entering a space between a road surface and a tread can be surely improved.

Particularly, the wide groove portion and the narrow groove portion are provided alternately in the tire circumferential direction. Accordingly, the water flowing in the intra-groove groove can be more surely drained from the wide groove portion to the narrow groove portion in the directions of the extended lines of the flow lines along the paired wall surfaces.

Moreover, the intra-groove groove is recessed inwardly in the tire radial direction from the circumferential groove while having its upper ends at the groove bottom of the circumferential groove. In other words, the intra-groove groove is provided away from the wall surfaces of the land portions. In this configuration, deterioration in stiffness of the land portions can be suppressed compared to the case where recessed portions and the like are formed in the groove walls of the land portions. Accordingly, negative effects on driving stability, a braking performance, and the like can be prevented.

Moreover, since the intra-groove groove is formed while having its upper ends at the groove bottom of the circumferential groove, the paired wall surfaces forming the intra-groove groove appear in a tread surface of the land portions in a latter stage of wear. Accordingly, an edge component of the paired wall surfaces increases in the latter stage of the wear and the braking performance, a drive performance, and the like can be thereby improved.

The paired wall surfaces each may include: a first curved portion formed to protrude toward a groove center line (groove center line DCL) passing through a center of the circumferential groove in the tread width direction; and a second curved portion being continuous with the first curved portion and formed to protrude in a direction away from the groove center line, and the first curved portion and the second curved portion are provided alternately in the tire circumferential direction.

A depth (narrow depth D1) of the narrow groove portion in the tire radial direction may be larger than a depth (wide depth D2) of the wide groove portion in the tire radial direction.

A raised portion raised outward in the tire radial direction may be formed on an intra-groove bottom surface in the wide groove portion, the raised portion may include: a first side portion (side portion 91) facing one of the paired wall surfaces and formed along the one wall surface; and a second side portion (side portion 92) facing the other one of the paired wall surfaces and formed along the other wall surface.

MODES FOR CARRYING OUT THE INVENTION

Figure 1:
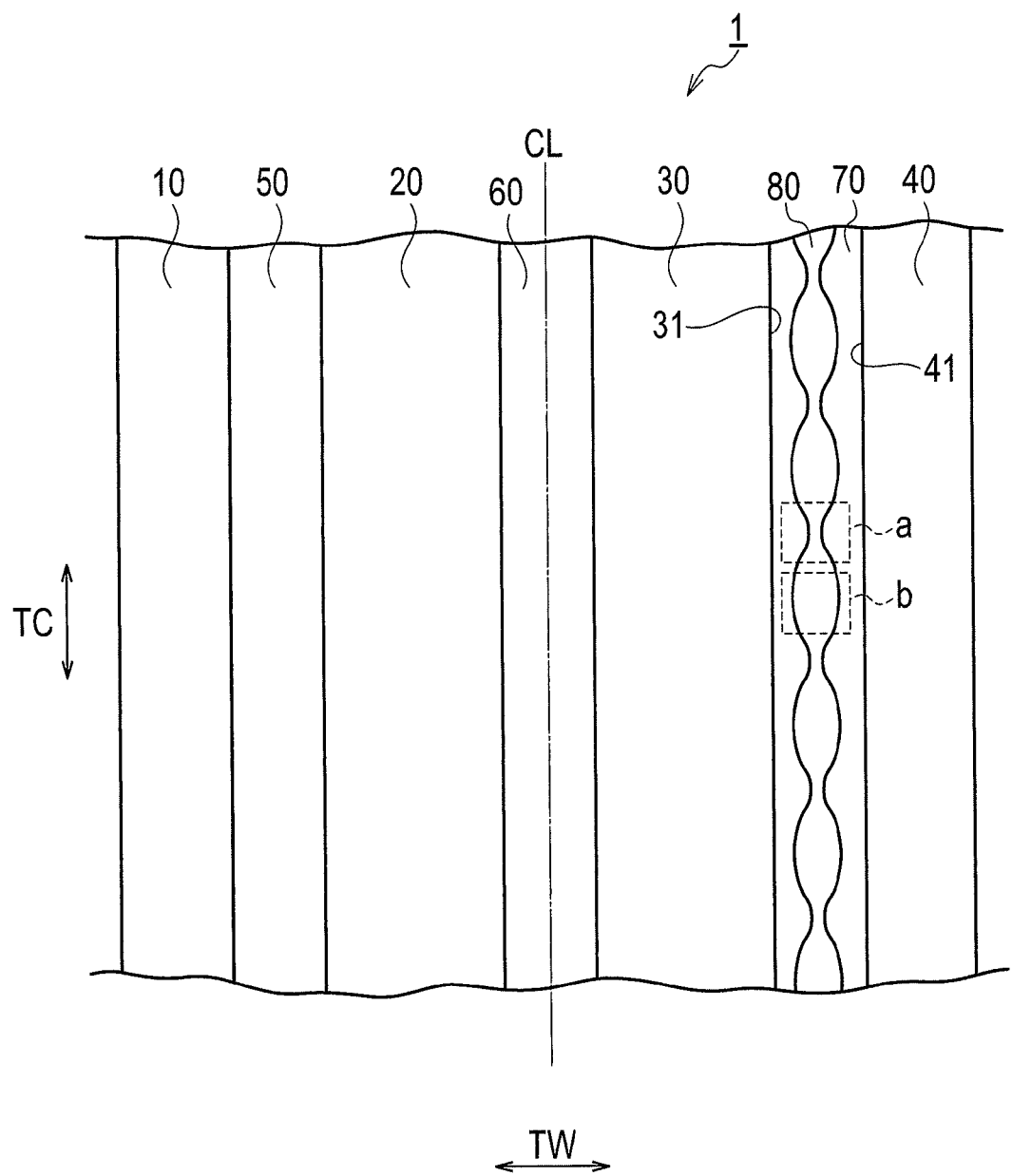
FIG. 1 is an exploded view showing a tread pattern of a pneumatic tire 1 according to a first embodiment.

Next, embodiments of a pneumatic tire according to the present invention will be described with reference to the drawings. Specifically, description will be given of (1) First Embodiment, (2) Second Embodiment, (3) Comparative Evaluations, and (4) Other Embodiments.

In the following drawings, identical or similar parts are denoted by identical or similar reference numerals. It should be noted that the drawings are schematic and ratios of dimensions and the like are different from actual ones.

Accordingly, specific dimensions and the like should be determined in consideration of the following descriptions. Moreover, the drawings include parts showing the dimensional relationships and ratios different from each other as a matter of course.

(1) First Embodiment

A configuration of a pneumatic tire according to a first embodiment will be described below. Specifically, description will be given of (1.1) Configuration of Tread Pattern,
(1.2) Detailed Configuration of Intra-groove Groove, and (1.3) Operations and Effects in this order.

In the first embodiment, a pneumatic tire 1 is a general radial tire including bead portions, a carcass layer, a belt layer, and a tread portion (not illustrated). Moreover, the pneumatic tire 1 may be filled with an inert gas such as a nitrogen gas instead of air.

(1.1) Configuration of Tread Pattern

Figure 2:
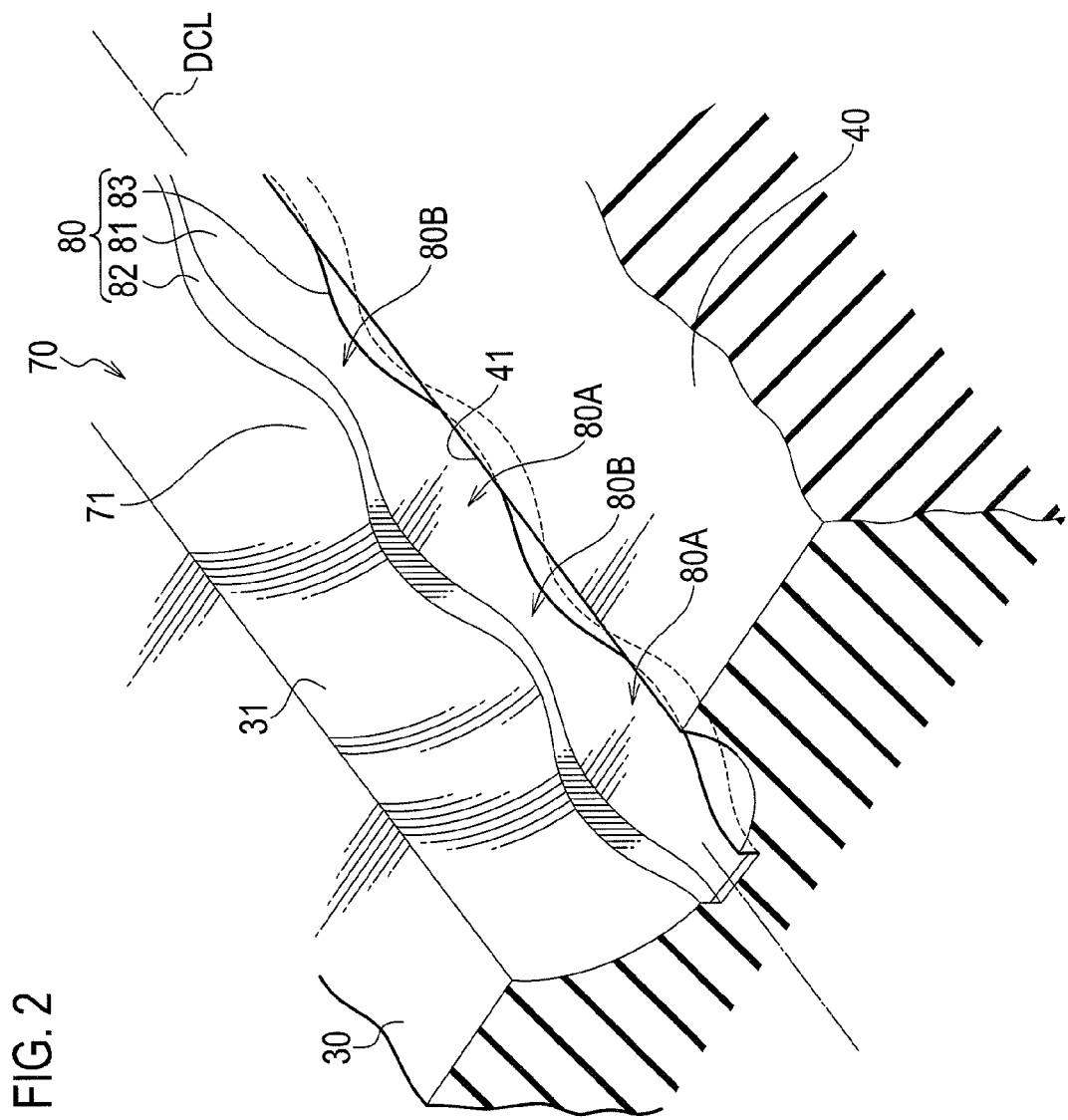
FIG. 2 is a perspective view showing a circumferential groove 70 according to the first embodiment and its vicinity.

First, a configuration of a tread pattern of the pneumatic tire 1 according to the first embodiment will be described with reference to the drawings. FIG. 1 is a developed view showing the tread pattern of the pneumatic tire 1 according to the first embodiment. FIG. 2 is a perspective view showing a circumferential groove 70 according to the first embodiment and its vicinity.

As shown in FIG. 1, the pneumatic tire 1 includes a land portion 10, a land portion 20, a land portion 30, and a land portion 40 which have rib shapes and extend in a tire circumferential direction (direction TC). Multiple circumferential grooves extending in straight shapes in the tire circumferential direction are formed between each two adjacent land portions. Specifically, a circumferential groove 50 is formed between the land portion 10 and land portion 20, a circumferential groove 60 is formed between the land portion 20 and the land portion 30, and a circumferential groove 70 is formed between the land portion 30 and the land portion 40.

The land portion 30 includes at least an inner wall surface 31 forming a wall surface of the circumferential groove 70 on the inner side in a tread width direction (direction TW). The land portion 40 includes at least an outer wall surface 41 forming a wall surface of the circumferential groove 70 on the outer side in the tread width direction.

As shown in FIGS. 1 and 2, the circumferential groove 70 is defined by the inner wall surface 31 described above, the outer wall surface 41 described above, and a groove bottom 71 continuous with the inner wall surface 31 and the outer wall surface 41. The circumferential groove 70 is curved to protrude inward in a tire radial direction in a tread width direction cross section. In other words, the inner wall surface 31, the outer wall surface 41, and the groove bottom 71 are smoothly continuous with one another.

The circumferential groove 70 is provided with an intra-groove groove 80 formed to recess inwardly in the tire radial direction (direction TR) from the circumferential groove 70 while having its upper ends at the groove bottom 71 of the circumferential groove 70.

(1.2) Detailed Configuration of Intra-Groove Groove

Figure 3:
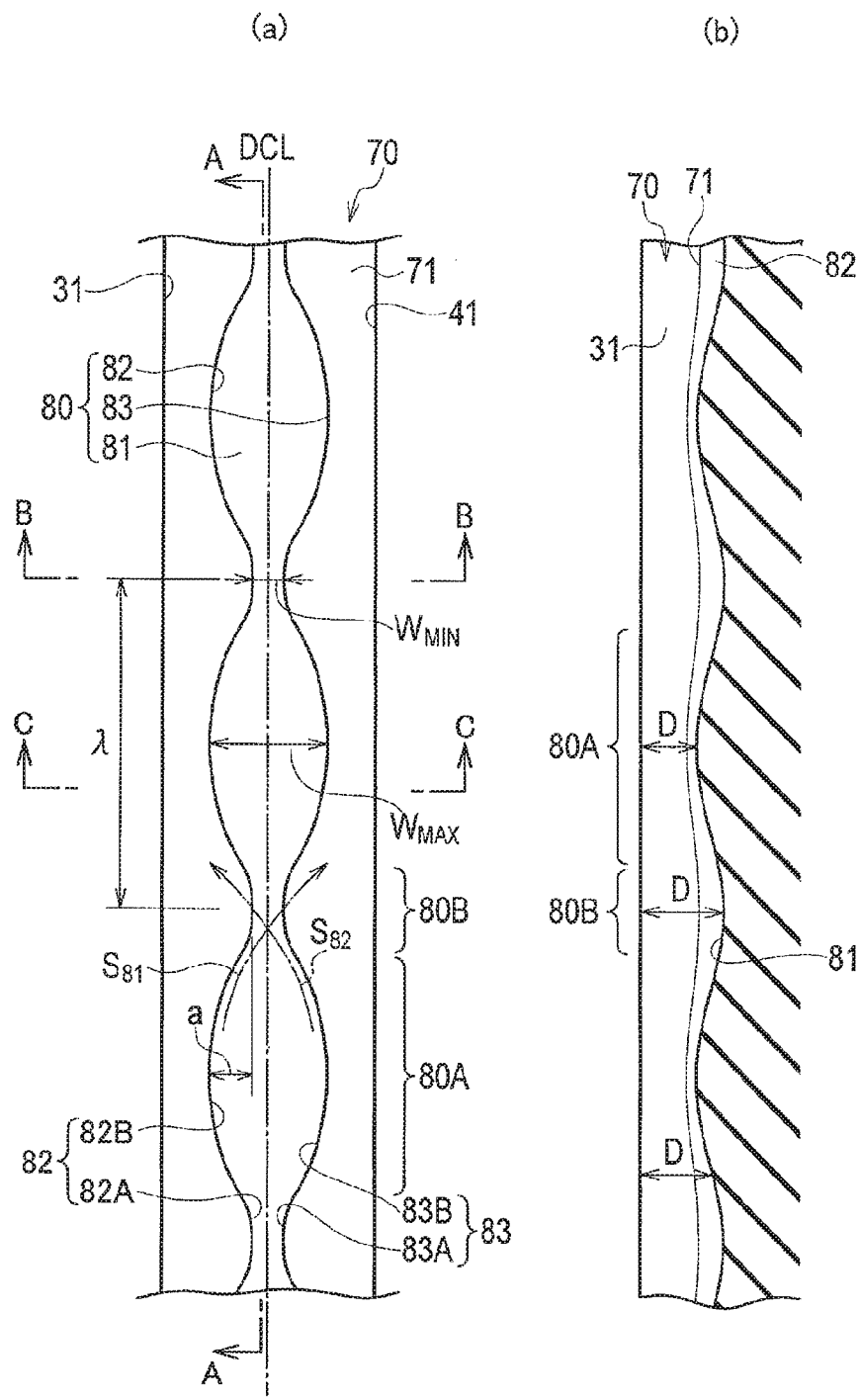
FIG. 3(a) is an enlarged developed view showing the circumferential groove 70 according to the first embodiment and its vicinity.
FIG. 3(b) is a cross-sectional view (cross-sectional view along the line A-A of FIG. 3 (a)) of the circumferential groove 70 according to the first embodiment which is taken in a tire circumferential direction.
Figure 4:
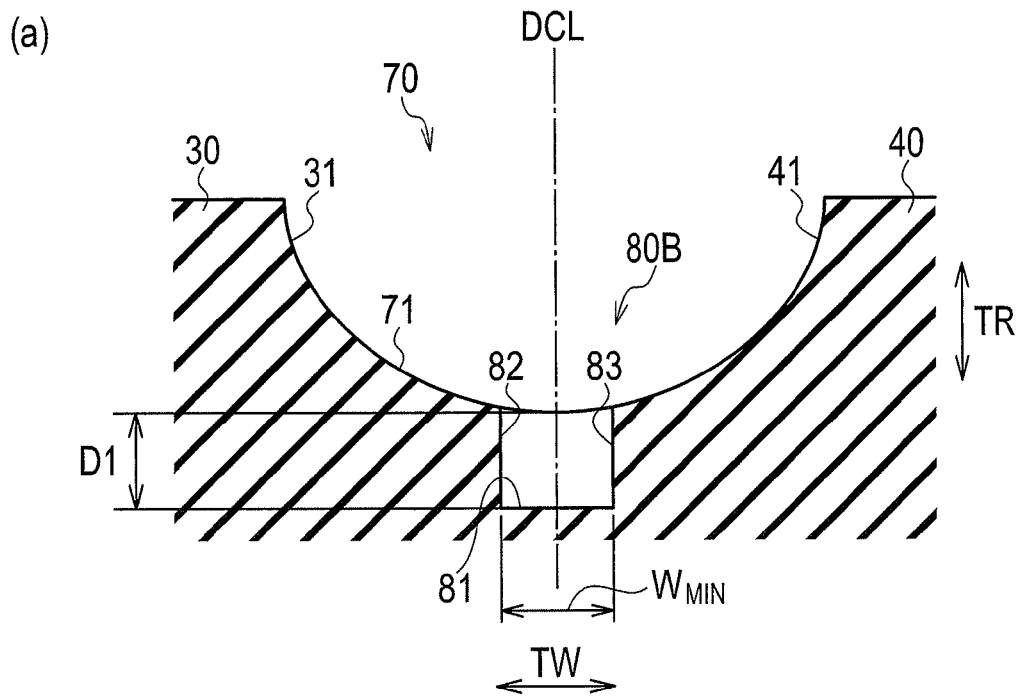
FIG. 4(a) is a tread width direction cross-sectional view (cross-sectional view along the line B-B of FIG. 3(a)) showing a narrow groove portion 80B according to the first embodiment.
FIG. 4(b) is a tread width direction cross-sectional view (cross-sectional view along the line C-C of FIG. 3(a)) showing a wide groove portion 80A according to the first embodiment.
Figure 4:
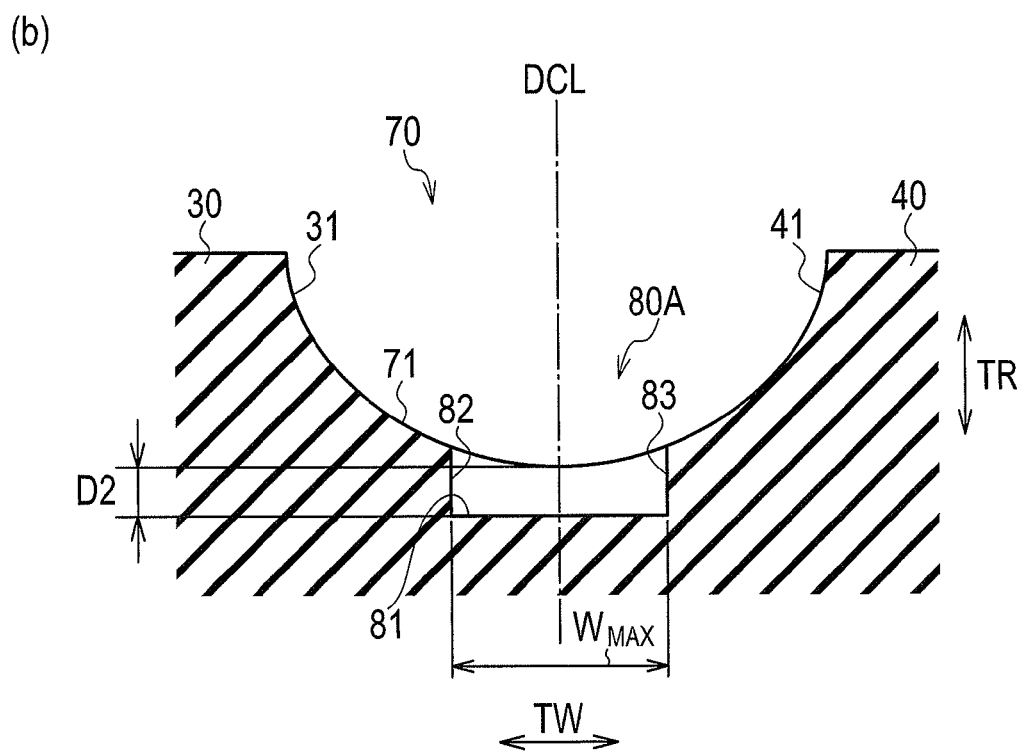

Next, a detailed configuration of the aforementioned intra-groove groove 80 is described with reference to FIGS. 2 to 4. FIG. 3(a) is an enlarged developed view showing the circumferential groove 70 according to the first embodiment and its vicinity. FIG. 3(b) is a cross-sectional view (cross-sectional view along the line A-A of FIG. 3(a)) of the circumferential groove 70 according to the first embodiment which is taken in the tire circumferential direction. FIG. 4(a) is a tread width direction cross-sectional view (cross-sectional view along the line B-B of FIG. 3(a)) showing a narrow groove portion 80B according to the first embodiment. FIG. 4(b) is a tread width direction cross-sectional view (cross-sectional view along the line C-C of FIG. 3(a)) showing a wide groove portion 80A according to the first embodiment.

As shown in FIGS. 2 and 3, the intra-groove groove 80 is located on a groove center line DCL. The groove center line DCL is a line which passes through the center of the circumferential groove 70 in the tread width direction and which is parallel to a tire equator line CL. In the first embodiment, the intra-groove groove 80 is provided to be symmetric with respect to the groove center line DCL.

The intra-groove groove 80 is formed by an intra-groove bottom surface 81 and paired wall surfaces (inner wall surface 82 and outer wall surface 83, hereafter). The intra-groove bottom surface 81 forms a bottom surface of the intra-groove groove 80 and is located inside the groove bottom 71 of the circumferential groove 70 in the tire radial direction. The inner wall surface 82 forms a wall surface of the intra-groove groove 80 on the inner side in the tread width direction. The outer wall surface 83 forms a wall surface of the intra-groove groove 80 on the outer side in the tread width direction.

The inner wall surface 82 and the outer wall surface 83 are connected to the groove bottom 71 of the circumferential groove 70 and the intra-groove bottom surface 81 and are formed in the tire radial direction. Moreover, the inner wall surface 82 and the outer wall surface 83 extend continuously in the tire circumferential direction while meandering in the tread width direction. Note that meandering indicates a winding formed by a series of almost S-shapes, excluding a winding formed by a series of zigzag shapes (almost Z-shapes).

Specifically, the inner wall surface 82 and the outer wall surface 83 are formed by continuously and alternately arranging first curved portions 82A, 83A and second curved portions 82B, 83B in the tire circumferential direction (see FIG. 3(a)). The first curved portions 82A, 83A are formed in shapes protruding toward the groove center line DCL. The second curved portions 82B, 83B are continuous with the first curved portions and are formed in shapes protruding in directions away from the groove center line DCL (toward the land portions).

The groove width of the intra-groove groove 80 in the tread width direction changes at a predetermined cycle (cycle λ, hereafter) in the tire circumferential direction. In other words, the inner wall surface 82 and the outer wall surface 83 each change at the cycle λ in the tire circumferential direction in a tread surface view, i.e. the inner wall surface 82 and the outer wall surface 83 each have an amplitude a in the tread width direction. For example, the cycle λ is 10 to 30 times the amplitude a.

The intra-groove groove 80 as described above includes the wide groove portions 80A and the narrow groove portions 80B. In the wide groove portions 80A, the groove width of the intra-groove groove 80 is a predetermined width. Moreover, each wide groove portion 80A includes a largest width portion $W_{MAX}$ of the groove width. Meanwhile, the narrow groove portions 80B are continuous with the wide groove portions 80A and the groove width of the intra-groove groove 80 is smaller than the predetermined width in the narrow groove portions 80B. Moreover, each narrow groove portion 80B includes a smallest width portion $W_{MIN}$ of the groove width.

The wide groove portions 80A and the narrow groove portions 80B are provided alternately in the tire circumferential direction. Moreover, the wide groove portions 80A and the narrow groove portions 80B are formed by continuous curved lines in the tread surface view.

A ratio $W_{MIN}/W_{MAX}$ between the largest width portion $W_{MAX}$ and the smallest width portion $W_{MIN}$ which are described above is preferably within a range of 25% to 85%.

Moreover, as shown in FIG. 3(b), the depth D of the intra-groove groove 80 in the tire radial direction changes. Specifically, the depth D of the intra-groove groove 80 gradually becomes larger from the wide groove portions 80A to the narrow groove portions 80B. Moreover, in the cross section of FIG. 3(b), the intra-groove groove 80 is formed by a continuous curved line.

As shown in FIG. 4(a) and FIG. 4(b), the depth of the narrow groove portion 80B in the tire radial direction (narrow depth D1, hereafter) is larger than the depth of the wide groove portion 80A in the tire radial direction (wide depth D2, hereafter). Note that the narrow depth D1 and the wide depth D2 are each the depth in the tire radial direction at a position on the groove center line DCL.

(1.3) Operations and Effects

In the first embodiment described above, the intra-groove groove 80 is formed in the circumferential groove 70. Moreover, each of the inner wall surface 82 and the outer wall surface 83 which form the intra-groove groove 80 extends continuously in the tire circumferential direction while meandering in the tread width direction. In this configuration, the volume of the circumferential groove 70 is increased while flows of water along the meandering of the inner wall surface 82 and the outer wall surface 83 is made to occur in the circumferential groove 70.

Specifically, the intra-groove groove 80 includes the wide groove portions 80A and the narrow groove portions 80B. Accordingly, water flowing in the intra-groove groove 80 pulsates in the circumferential groove 70 after passing through the wide groove portions 80A, due to the decrease in the groove width of the intra-groove groove 80. The pulsating water tends to be drained from the wide groove portions 80A to the narrow groove portions 80B in directions of extended lines of flow lines along the paired wall surfaces. Accordingly, a drainage performance of water entering a space between a road surface and a tread can be surely improved.

The wide groove portions 80A and the narrow groove portions 80B are provided alternately in the tire circumferential direction. Accordingly, the water flowing in the intra-groove groove 80 can be more surely drained from the wide groove portions 80A to the narrow groove portions 80B, in the directions of the extended lines of the flow lines ($S_{81}$, $S_{82}$ of FIG. 3) along the inner wall surface 82 and the outer wall surface 83.

Moreover, the intra-groove groove 80 is recessed inwardly in the tire radial direction from the circumferential groove 70 while having its upper ends at the groove bottom 71 of the circumferential groove 70. In other words, the intra-groove groove 80 is provided away from the inner wall surface 31 of the land portion 30 and the outer wall surface 41 of the land portion 40. In this configuration, deterioration in stiffness of the land portions can be suppressed compared to the case where recessed portions and the like are formed in the inner wall surface 31 of the land portion 30 and the outer wall surface 41 of the land portion 40. Accordingly, negative effects on driving stability, a braking performance, and the like can be prevented.

Moreover, since the intra-groove groove 80 is formed while having its upper ends at the groove bottom 71 of the circumferential groove 70, the inner wall surface 82 and the outer wall surface 83 which form the intra-groove groove 80 appear in the tread surface of the land portion 30 and the land portion 40 in a latter stage of wear. Accordingly, an edge component of the inner wall surface 82 and the outer wall surface 83 increases in the latter stage of the wear and the braking performance, a drive performance, and the like can be thereby improved.

In the first embodiment, the inner wall surface 82 and the outer wall surface 83 are formed by the first curved portions 82A, 83A and second curved portions 82B, 83B continuously alternating in the tire circumferential direction (see FIG. 3(a)). Accordingly, the water flowing in the intra-groove groove 80 can be more surely drained from the wide groove portions 80A to the narrow groove portions 80B, in the directions of extended lines of flow lines ($S_{81}$, $S_{82}$ of FIG. 3) along the inner wall surface 82 and the outer wall surface 83.

In the first embodiment, the circumferential groove 70 is curved to protrude inward in the tire radial direction in the tread width direction cross section. This makes it easier for the water flowing in the intra-groove groove 80 to be drained in the directions of the extended lines of the flow lines along the inner wall surface 82 and the outer wall surface 83 and in a direction outward in the tire radial direction from the circumferential groove 70. Accordingly, the drainage performance can be more surely improved.

Incidentally, when the intra-groove bottom surface 81 of the intra-groove groove 80 is formed in a smooth flat shape, the following situation occurs. Specifically, around a portion where the inner wall surface 82 and the outer wall surface 83 protrude into the intra-groove groove 80 due to the narrow groove portion 80B (inside the frame a of FIG. 1), the stiffness of the land portion 30 and the land portion 40 is increased by an amount corresponding to the protrusion into the intra-groove groove 80. Meanwhile, around a portion where the inner wall surface 82 and the outer wall surface 83 are recessed into the land portion 30 and the land portion 40 due to the wide groove portion 80A (inside the frame b of FIG. 1), the stiffness of the land portion 30 and the land portion 40 is reduced by an amount corresponding to the recessing into the land portion 30 and the land portion 40.

On the other hand, in the first embodiment, since the narrow depth D1 is larger than the wide depth D2, the stiffness around the portion where the inner wall surface 82 and the outer wall surface 83 protrude into the intra-groove groove 80 (around the frame a of FIG. 1) can be reduced. Moreover, since the wide depth D2 is smaller than the narrow depth D1, the stiffness around the portion where the inner wall surface 82 and the outer wall surface 83 are recessed into the land portion 30 and the land portion 40 (around the frame b of FIG. 1) can be increased. In other words, the stiffness of the land portion 30 and the land portion 40 tends to be even in the tire circumferential direction compared to the case where the intra-groove bottom surface 81 of the intra-groove groove 80 is formed to have the smooth flat shape. Accordingly, the contact pressure of the land portion 30 and the land portion 40 is made even in the tire circumferential direction. Hence, decrease in stiffness of the land portions is suppressed while occurrence of uneven wear is also suppressed.

In the first embodiment, the inner wall surface 82 and the outer wall surface 83 each have the amplitude a in the tread width direction and the cycle λ is 10 to 30 times the amplitude a. When the cycle λ is smaller than 10 times the amplitude a, the flows along the inner wall surface 82 and the outer wall surface 83 and the flow in the tire circumferential direction excessively concentrate in the narrow groove portions 80B and it becomes difficult to improve the drainage performance. Meanwhile, when the cycle λ is larger than 30 times the amplitude a, the water in the circumferential groove 70 does not sufficiently pulsate and it becomes difficult to effectively drain the water flowing in the circumferential groove 70 to the outside of the circumferential groove 70.

In the first embodiment, the ratio $W_{MIN}/W_{MAX}$ between the smallest width portion $W_{MIN}$ and the largest width portion $W_{MAX}$ is within the range of 25% to 85%. When the ratio $W_{MIN}/W_{MAX}$ is smaller than 25%, the flows of water along the inner wall surface 82 and the outer wall surface 83 and the flow of water in the tire circumferential direction excessively concentrate in the smallest width portion $W_{MIN}$ and it becomes difficult to improve the drainage performance. Meanwhile, when the ratio $W_{MIN}/W_{MAX}$ is larger than 85%, the water in the circumferential groove 70 does not suffi-ciently pulsate and it becomes difficult to effectively drain the water flowing in the circumferential groove 70 to the outside of the circumferential groove 70.

(2) Second Embodiment

A pneumatic tire 2 according to the second embodiment of the present invention will be described below with reference to the drawings. Note that parts identical to the parts of the pneumatic tire 1 of the first embodiment described above are denoted by the identical reference numerals and different parts are mainly described.

In the first embodiment described above, no raised portions to be described later are provided in the circumferential groove 70 of the pneumatic tire 1. Meanwhile, in the second embodiment, the raised portions to be described later are provided in a circumferential groove 70 of the pneumatic tire 2. Specifically, in the second embodiment, (2.1) Detailed Configuration of Intra-Groove Groove and (2.2) Operations and Effects will be described with reference to the drawings.

(2.1) Detailed Configuration of Intra-Groove Groove

Figure 5:
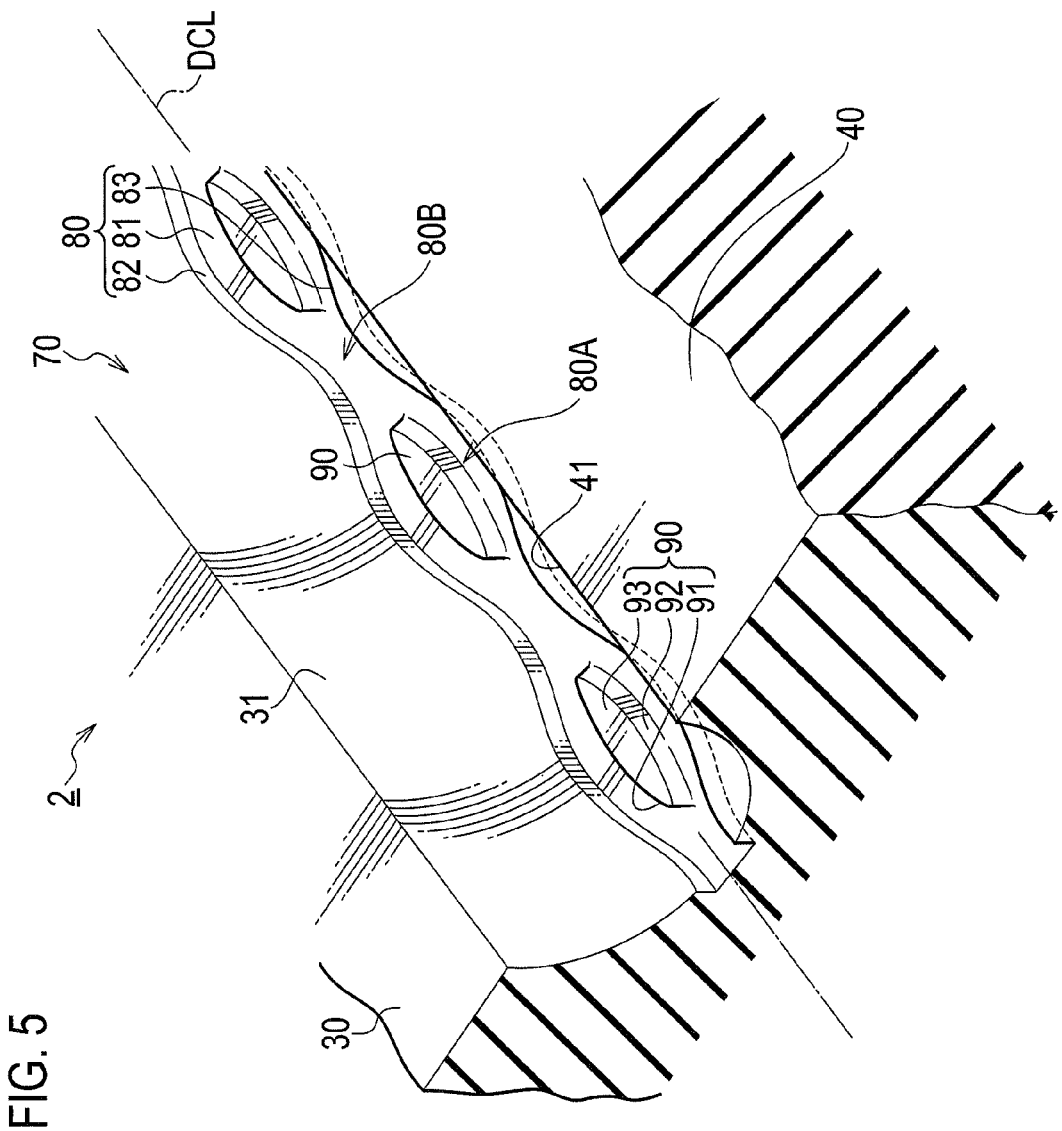
FIG. 5 is a perspective view showing a circumferential groove 70 according to a second embodiment and its vicinity.

FIG. 5 is a perspective view showing the circumferential groove 70 according to the second embodiment and its vicinity. FIG. 6(a) is an enlarged developed view showing the circumferential groove 70 according to the second embodiment and its vicinity. FIG. 6(b) is a cross-sectional view (cross-sectional view along the line A-A of FIG. 6(a)) of the circumferential groove 70 according to the second embodiment which is taken in a tire circumferential direction.

Figure 6:
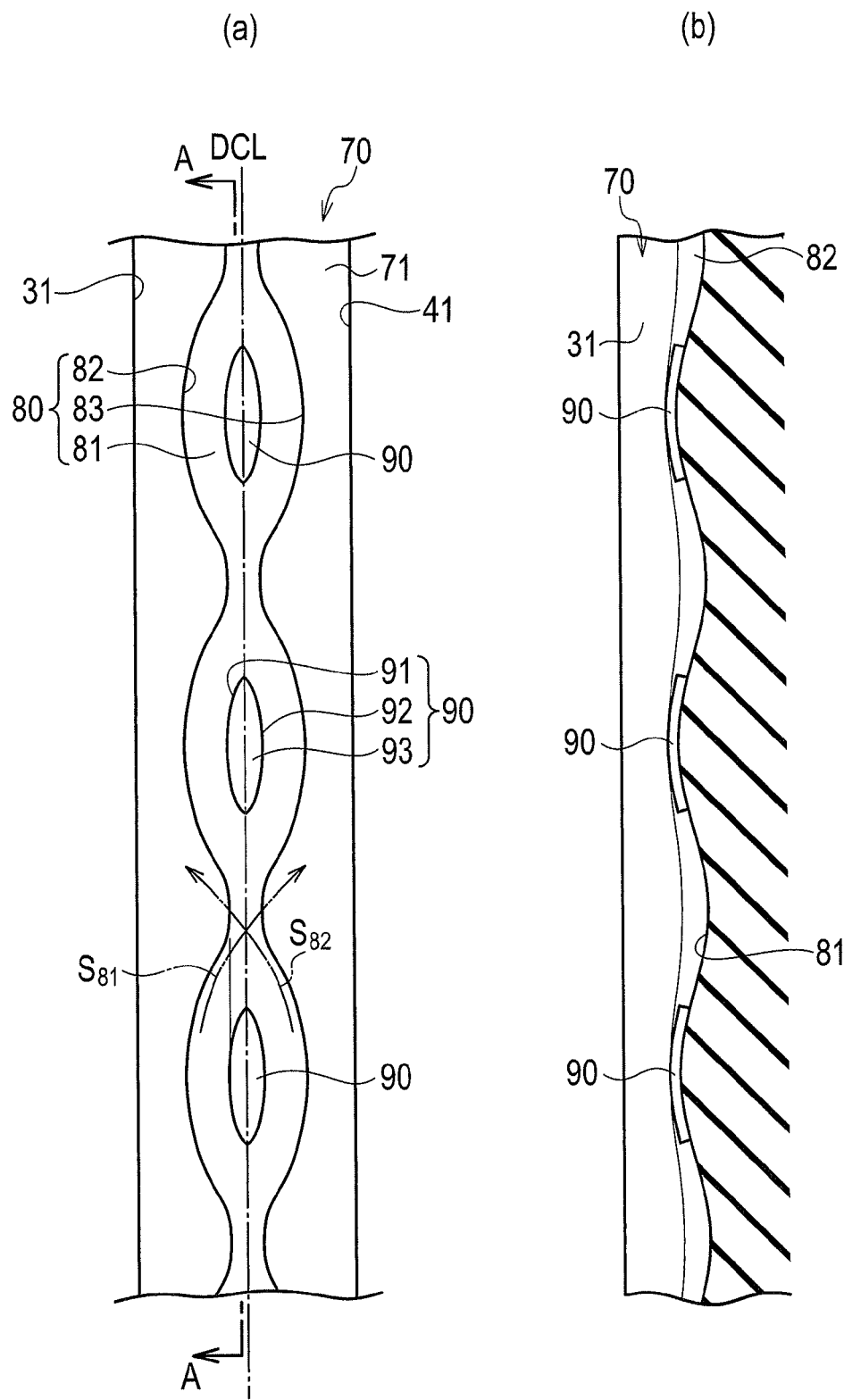
FIG. 6(a) is an enlarged developed view showing the circumferential groove 70 according to the second embodiment and its vicinity.
FIG. 6(b) is a cross-sectional view (cross-sectional view along the line A-A of FIG. 6(a)) of the circumferential groove 70 according to the second embodiment which is taken in a tire circumferential direction.

As shown in FIGS. 5 and 6, raised portions 90 raised outward in a tire radial direction are formed on an intra-groove bottom surface 81 of wide groove portions 80A. Each raised portion 90 is formed in a shape elongated and tapered in the tire circumferential direction in a tread surface view.

The raised portions 90 are located on a groove center line DCL and are provided away from the inner wall surface 82 and the outer wall surface 83. The raised portions 90 are provided to be symmetric with respect to the groove center line DCL.

Each raised portion 90 includes a side portion 91 (first side portion), aside portion 92 (second side portion), and a top surface 93. The side portion 91 faces an inner wall surface 82 of the intra-groove 80, and is formed along the inner wall surface 82. The side portion 92 faces the outer wall surface 83 of the intra-groove 80 and is formed along the outer wall surface 83. The top surface 93 is provided almost parallel to the intra-groove bottom surface 81.

Each raised portion 90 is not always required include the side portion 91, the side portion 92, and the top surface 93 and may include only the side portion 91 and the side portion 92 (i.e. the raised portion 90 may have an almost triangular shape in the tread width direction), for example.

(2.2) Operations and Effects

In the second embodiment described above, the side portion 91 and the side portion 92 of each raised portion 90 extend respectively along the inner wall surface 82 and the outer wall surface 83 which form an intra-groove groove 80. This makes it easier for the water flowing in the wide groove portions 80A to flow along the inner wall surface 82 and the outer wall surface 83 and a drainage performance can be more surely improved.

Moreover, the raised portions 90 appear in a tread surface of a land portion 30 and a land portion 40 in a latter stage of wear. Accordingly, an edge component of the side portions 91 and the side portions 92 increases in the latter stage of the wear and a braking performance and a drive performance can be thereby improved.

(3) Comparative Evaluations

Next, in order to further clarify the effects of the present invention, description will be given of comparative evaluations using pneumatic tires according to Examples and Comparative Example described below. Specifically, (3.1) Configuration of Each Pneumatic Tire and (3.2) Evaluation Results will be described with reference to Table 1. Note that the present invention is not limited at all to these examples.

TABLE 1

Figure 7:
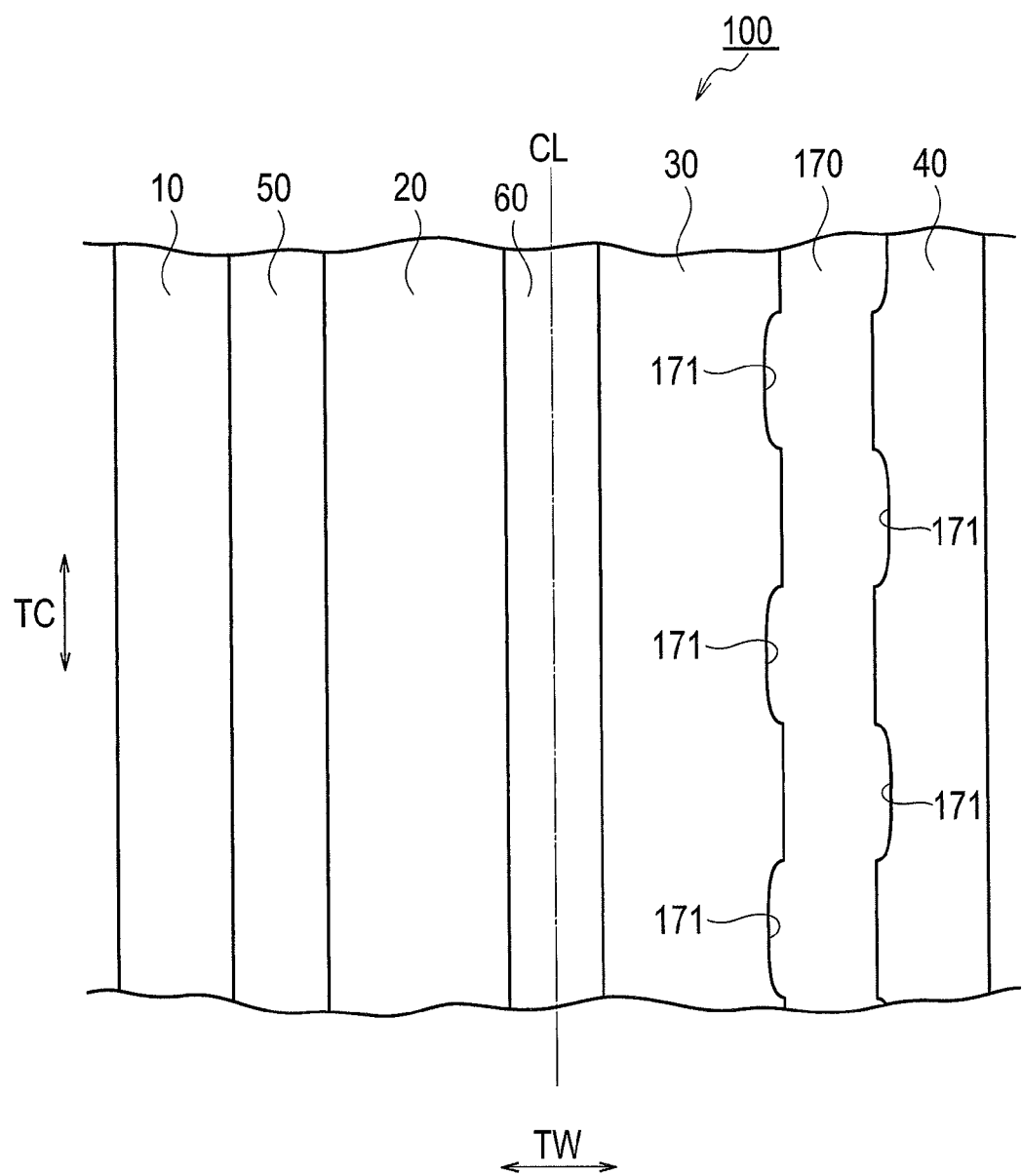
FIG. 7 is a developed view showing a tread pattern of a pneumatic tire 100 of Comparative Example.

| Configuration of Main Groove | Comparative Example Fig. 7 | Example 1 First Embodiment (Figs. 1 to 4) | Example 2 Second Embodiment (Figs. 5 to 6) |
|---|---|---|---|
| Hydroplaning Performance | 100 | 101 | 103 |
| Uneven Wear | 100 | 105 | 105 |

(3.1) Configuration of Each Pneumatic Tire

Data on each type of pneumatic tire was measured under the conditions shown below.
Tire size: 225/45R17
Rim/wheel size: 17×7J
Type of tire: Normal tire
Type of vehicle: Japanese sedan car
Load condition: 600N+weight of driver The pneumatic tire 1 of Example 1 is one described in the first embodiment (see FIGS. 1 to 4). The pneumatic tire 2 of Example 2 is one described in the second embodiment (see FIGS. 5 and 6).

As shown in FIG. 7, a pneumatic tire 100 of Comparative Example is different in a configuration of a circumferential groove 170, compared to the pneumatic tires of Examples. Specifically, in the circumferential groove 170, no intra-groove groove 80 is formed and recessed portions 171 described in background art are formed.

(3.2) Evaluation Results (3.2.1) Hydroplaning Test

Vehicles fitted with the respective types of pneumatic tires were made to enter a rainy road having a water depth of 10 mm at a speed of 80 km/h and were then accelerated. An index of "100" was assigned to a speed at which hydroplaning occurred in the vehicle fitted with the pneumatic tires 100 of Comparative Example and speeds at which hydroplaning occurred in the vehicles fitted with other types of pneumatic tires were indicated in indices. A larger index means that hydroplaning is less likely to occur.

As a result, as shown in Table 1, it was found that hydroplaning is less likely to occur in the vehicles fitted with the pneumatic tires of Examples 1 and 2 than in the vehicle fitted with the pneumatic tires 100 of Comparative Example.

(3.2.2) Uneven Wear Test

The vehicles fitted with the respective types of pneumatic tires were driven for 30,000 km. Thereafter, an index of "100" was assigned to uneven wear (the amount of wear compared to a brand-new tire) of the vehicle fitted with the pneumatic tires 100 of Comparative Example and uneven wear in the other types of pneumatic tires was visually evaluated. A larger index means that an uneven wear amount is small and uneven wear is less likely to occur.

As a result, as shown in Table 1, it was found that uneven wear is less likely to occur in the vehicles fitted with the pneumatic tires of Examples 1 and 2 than in the vehicle fitted with the pneumatic tires of Comparative Example.

(4) Other Embodiments

The contents of the present invention have been disclosed by using the embodiments of the present invention as described above. However, the descriptions and drawings forming part of this disclosure should not be understood to limit the present invention. Various alternative embodiments, examples, and operation techniques will be found by those skilled in the art from this disclosure.

For example, the embodiments of the present invention can be modified as follows. Specifically, the tire may be the pneumatic tire 1 filled with air, nitrogen gas, or the like, or may be a solid tire filled with no air, nitrogen gas, or the like.

The numbers of land portions and circumferential grooves provided in the pneumatic tire 1 described above and arrangement positions thereof are not limited to those described in the embodiments and may be appropriately selected depending on an objective as a matter of course. For example, the circumferential grooves are not necessarily required to extend in a straight shape in the tire circumferential direction and may slightly meander.

Moreover, the intra-groove groove 80 is not necessarily required to be formed only in the circumferential groove 70 and may be formed only in the circumferential groove 50, only in the circumferential groove 60, or in all of the circumferential grooves 50 to 70.

Furthermore, the intra-groove groove 80 is not necessarily required to be located on the groove center line DCL and may be offset from the groove center line DCL in the tread width direction. In addition, the intra-groove groove 80 is not necessarily required to be provided to be symmetric with respect to the groove center line DCL and may be provided to be asymmetric with respect to the groove center line DCL. For example, the inner wall surface 82 and the outer wall surface 83 may be formed such that the respective cycles thereof are offset from each other in the tire circumferential direction.

Moreover, the inner wall surface 82 and the outer wall surface 83 are described to be formed by the first curved portions 82A, 83A and second curved portions 82B, 83B continuously alternating in the tire circumferential direction. However, the inner wall surface 82 and the outer wall surface 83 are not limited to this configuration, but may be formed with the first and second curved portions 82A, 83A and 82B, 83B connected to each other via straight wall surfaces.

Moreover, although the intra-groove groove 80 is described to be formed by a continuous curved line in the cross section of FIG. 3(b), the intra-groove groove 80 is not limited to this configuration. For example, at least part of the intra-groove groove 80 may be formed by a straight line. Furthermore, the depth D of the intra-groove groove 80 is not necessarily required to become gradually larger from the wide groove portions 80A to the narrow groove portions 80B.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2010-107426 (filed on May 7, 2010) is incorporated herein by reference.

INDUSTRIAL APPLICABILITY

As described above, the tires of the present invention has circumferential grooves formed therein and are capable of suppressing deterioration in the stiffness of the land portions and also improving the drainage performance. Accordingly, the present invention is useful in the field of tire manufacturing.

EXPLANATION OF THE REFERENCE NUMERALS

1, 2 pneumatic tire
10, 20, 30, 40 land portion
31 inner wall surface
41 outer wall surface
50, 60, 70 circumferential groove
71 groove bottom
80 intra-groove groove
80A wide groove portion
80B narrow groove portion
81 intra-groove bottom surface
82 inner wall surface
83 outer wall surface
82A, 83A first curved portion
82B, 83B second curved portion
90 raised portion
91, 92 side portion
93 top surface

The invention claimed is:

1. A tire which includes a plurality of rib-shaped land portions extending in a tire circumferential direction and in which a circumferential groove is formed in an arc shape in a tread width direction cross section and extending in the tire circumferential direction between the land portions, wherein
the circumferential groove is provided with an intra-groove groove formed to recess inwardly in a tire radial direction from the circumferential groove while having its upper ends at a groove bottom of the circumferential groove,
paired wall surfaces forming the intra-groove groove each continuously extend in the tire circumferential direction while meandering in the tread width direction,
the intra-groove groove includes:
a wide groove portion in which a groove width of the intra-groove groove in the tread width direction is a predetermined width; and
a narrow groove portion which is continuous with the wide groove portion and which has a narrower width than the predetermined width, and
the wide groove portion and the narrow groove portion are alternately provided in the tire circumferential direction, wherein
a depth of the narrow groove portion in the tire radial direction is larger than a depth of the wide groove portion in the tire radial direction,
wherein the paired wall surfaces each include:
a first curved portion formed to protrude toward a groove center line passing through a center of the circumferential groove in the tread width direction; and
a second curved portion being continuous with the first curved portion and formed to protrude in a direction away from the groove center line, and
the first curved portion and the second curved portion are provided alternately in the tire circumferential direction in a series of substantially S-shapes, and
wherein the paired wall surfaces are formed in symmetry with respect to the groove center line in a tread surface view.

2. The tire according to claim 1, wherein
a raised portion raised outward in the tire radial direction is formed on an intra-groove bottom surface in the wide groove portion,
the raised portion includes:
a first side portion facing one of the paired wall surfaces and formed along the one wall surface; and
a second side portion facing the other one of the paired wall surfaces and formed along the other wall surface.

* * * * *